US007059653B2

(12) United States Patent
Oberheide

(10) Patent No.: US 7,059,653 B2
(45) Date of Patent: Jun. 13, 2006

(54) ACTUATOR AND CONTROL FOR POWER DECKLID PULLDOWN

(75) Inventor: G. Clarke Oberheide, Troy, MI (US)

(73) Assignee: Intier Automotive Closures Inc., Newmarket (CA)

(*) Notice: Subject to any disclaimer, the term of this patent is extended or adjusted under 35 U.S.C. 154(b) by 40 days.

(21) Appl. No.: 10/494,586

(22) PCT Filed: Nov. 6, 2002

(86) PCT No.: PCT/CA02/01688

§ 371 (c)(1), (2), (4) Date: May 5, 2004

(87) PCT Pub. No.: WO03/040503

PCT Pub. Date: May 15, 2003

(65) Prior Publication Data

US 2004/0244292 A1 Dec. 9, 2004

Related U.S. Application Data

(60) Provisional application No. 60/332,642, filed on Nov. 6, 2001.

(51) Int. Cl.
*B60J 5/00* (2006.01)

(52) U.S. Cl. .................................... 296/146.1; 296/76

(58) Field of Classification Search ............. 296/146.1, 296/146.4, 76, 50, 56, 223

See application file for complete search history.

(56) References Cited

U.S. PATENT DOCUMENTS 2,833,536 A 5/1958 Joachim et al.
3,343,303 A 9/1967 Wanless
4,739,585 A 4/1988 Pickles
4,823,059 A 4/1989 Compeau et al.
4,851,742 A 7/1989 Chapman
4,984,385 A * 1/1991 DeLand ...................... 49/280
5,531,498 A 7/1996 Kowall
5,896,703 A 4/1999 Wright et al.
6,092,336 A 7/2000 Wright et al.
6,181,094 B1 1/2001 Menke
6,185,868 B1 2/2001 Kato
2002/0046496 A1 4/2002 Schimizu
2002/0088180 A1 7/2002 Yokomori
2005/0121940 A1* 6/2005 Kleinmann et al. ...... 296/146.4

* cited by examiner

*Primary Examiner*—H. Gutman
(74) *Attorney, Agent, or Firm*—Clark Hill PLC

(57) ABSTRACT

A drive assembly moves a vehicle closure panel from an open to a closed condition. The drive assembly has a housing and a motor mounted on the housing. A drum and gear assembly is rotatably mounted on the housing. The drum and gear assembly has a drum having a helical groove, a gear in driving engagement with the motor, and a spring biasing the drum in a winding direction relative to the gear. The drum and gear have a lost motion connection therebetween. A cable has an end connected to the closure panel and an opposite end connected to the drum about the helical groove in the winding direction. The drum rotates in the winding direction relative to the stationary gear as the closure panel is manually moved from the open to the closed condition with the spring maintaining a cable tension. The drum and gear rotate together in the winding direction upon energizing the motor effecting powered movement of the closure panel to the closed condition. The motor is afterwards energized in an opposite direction counter-rotating the gear relative to the drum back to a start position.

17 Claims, 3 Drawing Sheets

FIG - 1
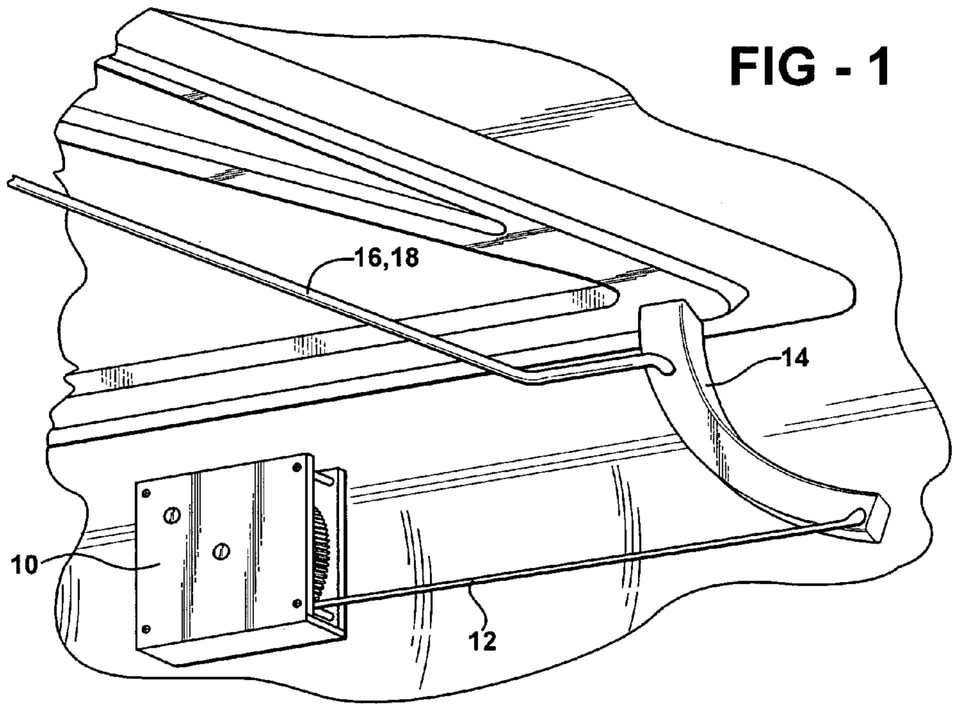
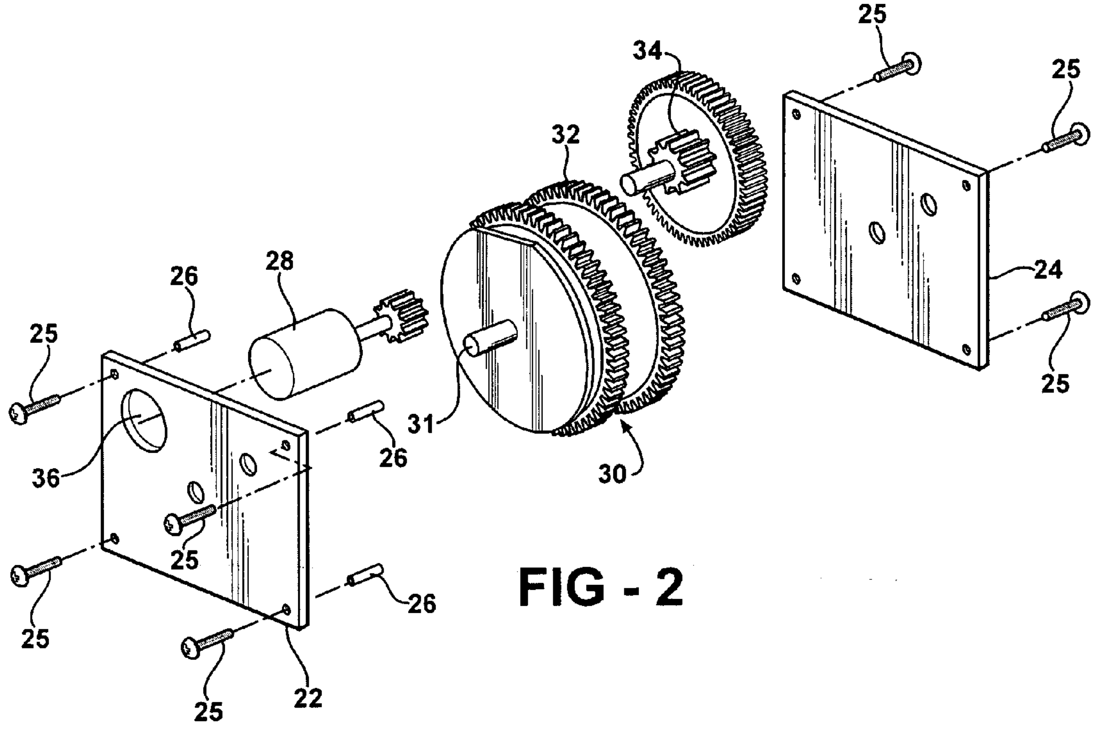
FIG - 2

FIG - 3
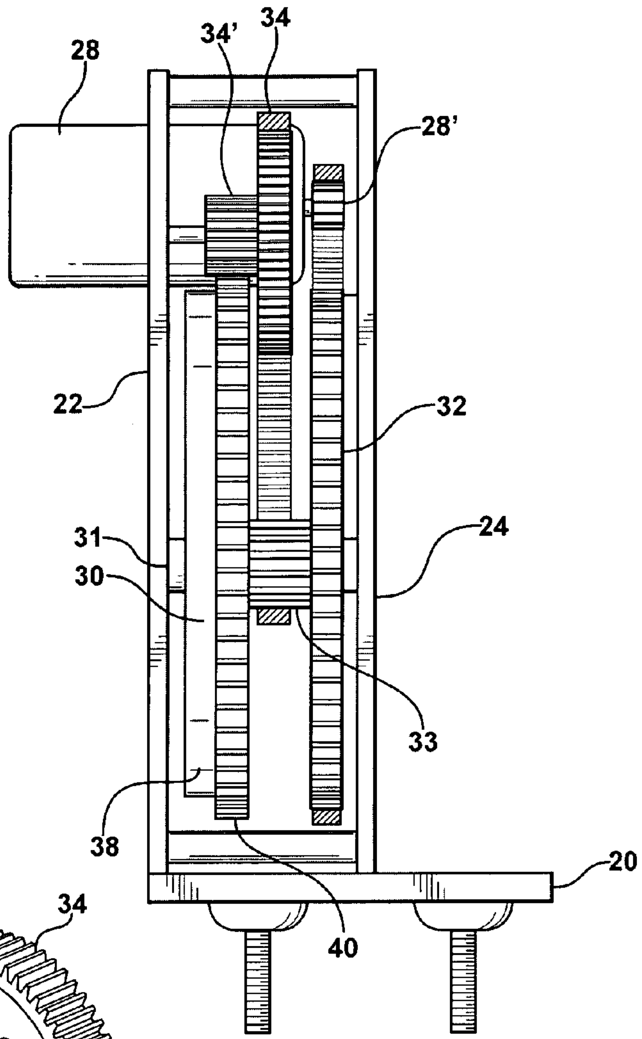
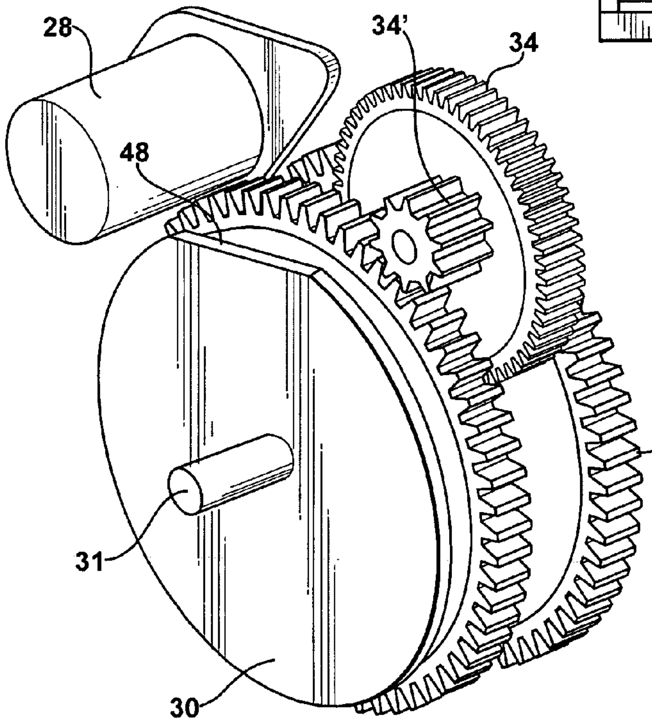
FIG - 4

ACTUATOR AND CONTROL FOR POWER DECKLID PULLDOWN

This application claims the beneift of Provisional Application No. 60/332,642 filed on Nov. 6, 2001.

BACKGROUND OF THE INVENTION

1. Field of Invention

This invention relates to an actuator and a control for a power decklid.

2. Background of Invention

It is common to provide a vehicle with a trunk or deck lid that has an automatic power releasing latch. Activation of the power latch releases the deck lid. Springs located in the hinges urge the deck lid to move into the fully open condition.

Systems have been proposed that provide a mechanism for automatically closing the deck lid to a secondary closed position whereupon the latch automatically cinches the deck lid to the primary closed and sealed position. Such systems include U.S. Pat. Nos. 4,739,585 and 4,823,059.

U.S. Pat. No. 4,823,059 discloses a cable driven system whereby a cable is wound about a drum having the remote end connected to the hinge of the deck lid. An actuator drives the drum to wind the cable and pull the deck lid down to engage the latch. The current of the motor is monitored to determine when the deck lid reaches the secondary closed condition, the primary closed condition and also detects obstacles in the path of the closing deck lid.

The prior art systems provide a direct drive connection between the actuator and the deck lid. Thus, when the deck lid is being closed manually, the operator must back drive the motor, which is undesirable.

It remains desirable to provide a simple mechanism for allowing manual movement of the deck lid between the open and closed conditions without back driving the motor.

SUMMARY OF THE INVENTION

The disadvantages of the prior art may be overcome by providing a simple mechanism for effecting a closing movement of a closure panel of a vehicle.

According to one aspect of the invention, there is provided a drive assembly that moves a vehicle closure panel between open and closed conditions. The drive assembly has a housing and a motor mounted on the housing. A drum and gear assembly is rotatably mounted on the housing. The drum and gear assembly has a drum having a helical groove and a gear in driving engagement with the motor. The drum and the gear also have a lost motion connection defined therebetween to allow manual movement of the drum relative to the gear in the winding direction. A cable has an end fixedly secured to the closure panel and an opposite end fixedly secured to the drum to wind the cable about the helical groove during movement of the drum in the winding direction for moving the closure panel between the open and closed conditions.

DESCRIPTION OF THE DRAWINGS

In drawings which illustrate the preferred embodiment of the present invention,

FIG. 1 is a perspective view of the actuator of the present invention;

FIG. 2 is an exploded view of the embodiment of FIG. 1;

FIG. 3 is an end elevational view of the embodiment of FIG. 1;

FIG. 4 is a perspective view of the embodiment of FIG. 1, with side panels removed;

DESCRIPTION OF THE PREFERRED EMBODIMENT

Figure 5:
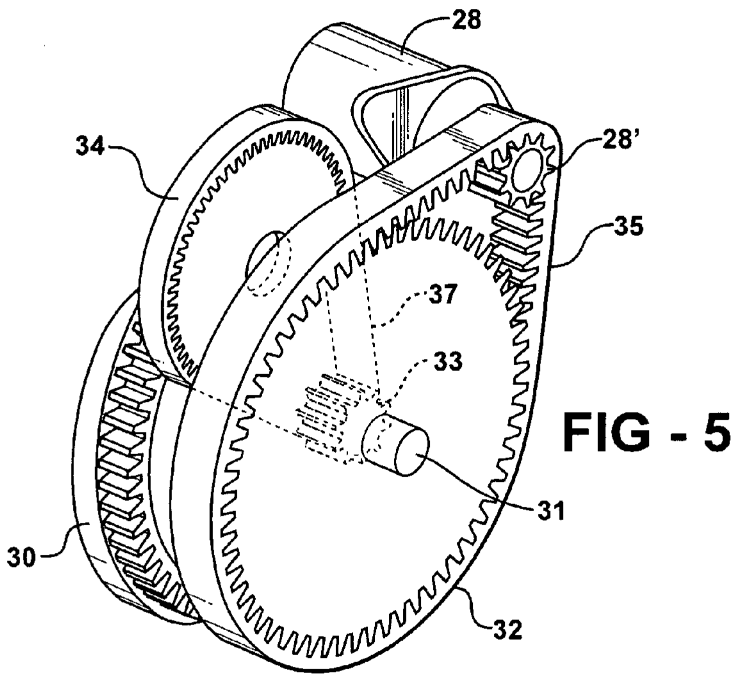
FIG. 5 is a perspective view, reverse from FIG. 3.

Referring to FIG. 1, an actuator 10 of the present invention is generally illustrated mounted within a trunk of vehicle. A cable 12 is connected at one end to the actuator 10 and at an opposite end to a goose neck type hinge 14. The hinge 14 connects a deck lid to the vehicle enabling the deck lid to open and close. Torsion bars 16, 18 provide a bias to the deck lid that urges the deck lid to move to the open condition upon release of a latch.

Referring to FIGS. 2–5, the actuator 10 generally includes a base plate 20, opposite side plates 22, 24, spacers 26, motor 28, drum and gear assembly 30, driven gear 32 and drive gear 34. A plurality of screws 25 is provided to mount the side plates 22, 24 onto the base plate 20. The spacers 26 maintain the side plates in a spaced and generally parallel relation. The motor 28 is mounted on the side plate 22 through an aperture 36 formed in the side plate 22. The drum and gear assembly 30 and gear 32 are commonly mounted on an axle 31. The drive gear 34 is rotatably mounted to the side plates 22, 24. A drive pinion gear 34' is coaxially mounted to the drive gear 34 and positioned to be in driving engagement with a gear 40 of the drum and gear assembly 30. More specifically, a first belt 35 is trained about a first pinion 28' on an output shaft of the motor 28 and the driven gear 32. A second belt 37 is trained about the drive gear 34 and a second pinion gear 33 coaxially mounted to the driven gear 32. Thus, a driving force multiplying connection between motor 28 and the drum and gear assembly 30 is provided. Alternatively, gears can be used for force multiplying if tooth noise is not objectionable.

Figure 6:
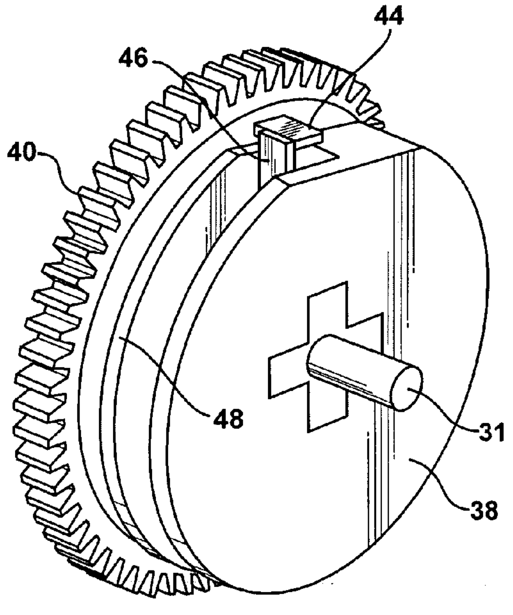
FIG. 6 is a schematic view of the drum and gear assembly of the embodiment of FIG. 1.
Figure 7:
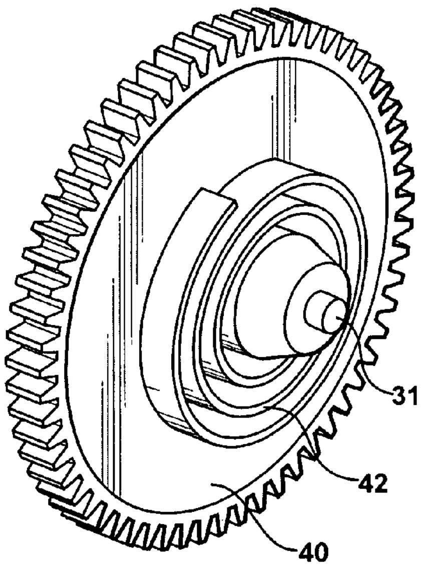
FIG. 7 is a schematic view of the spring connection between the drum and gear of FIG. 5.

Referring to FIGS. 6 and 7, the drum and gear assembly 30 is illustrated. The drum and gear assembly 30 includes a drum 38 and a gear 40. A spiral or clock spring 42, shown in FIG. 7, extends between the drum 38 and the gear 40 for biasing the drum 38 against the cable 12 connection to the door hinge 14. The gear 40 has a tab 44 that extends axially to engage a tab 46 on the drum 38. Tab 46 is mounted at the end of a helical groove or ramp 48. The arrangement of the drum and gear assembly 30 provides a lost motion connection between the drum 38 and the gear 40 that allows the drum 38 to rotate relative to the gear 40 in one direction and according to the decklid position. The spring 42 urges the drum 38 to rotate in the opposite direction and maintains a nominal tension on the cable 12 in the range of about 20 to 40 N.

The drum 38 is selected to have a size limited to less than one revolution, i.e., one revolution of the drum provides full motion to close the deck lid from the full open condition to the closed condition. Preferably, the drum rotates between 270° and 360°, but most preferably about 340°, and has a 25 mm radius thereby providing about 500 N of force on 175 mm of travel.

In operation, the actuator 10 of the present invention allows both manual and powered operation. In the fully open condition, tabs 44, 46 are generally juxtaposed in a start position for immediate engagement. If an operator manually closes the deck lid, the clock spring 42 urges the drum 38 to rotate in a winding sense to accomodate a resulting slack in the cable 12 while the gear 40 remains stationary thus rotationally separating the tabs 44, 46 up to one revolution. Upon opening of the deck lid, the cable 12 will pull and cause the drum 38 to rotate in the opposite unwinding sense. If the operator energizes the motor 28 either remotely or by pressing an activation switch, the motor 28 effects rotation of the gear 40 and through engagement of the tabs 44, 46 rotates drum 38 in the winding sense. Once the deck lid is latched, the motor 28 is reversed about one revolution to return the gear 40 and the drum 38 to the start position. A simple stop or limit switch can be provided on the actuator 10 to limit reverse travel.

The actuator 10 of the present invention can be incorporated into a comprehensive system for opening and closing the deck lid. A central controller is provided to control operation of the actuator 10 as well as the operation of a power latch having cinching and releasing function. The operator causes the power latch to unlatch and the deck lid opens under the influence of the torsion bars 16, 18. The operator next enables the closing function energizing the actuator 10 until the deck lid engages the latch in the secondary position. The controller disables the actuator 10 and enables the cinching function of the latch to cinch the latch to the primary closed condition. The controller simultaneously reverses the actuator 10 to the open position.

The present invention is defined by the claims appended hereto, with the foregoing description being illustrative of a preferred embodiment of the invention. Those of ordinary skill may envisage certain additions, deletions and/or modifications to the described embodiment which, although not explicitly described or suggested herein, do not depart from the scope of the present invention, as defined by the appended claims.

What is claimed is:

1. A drive assembly for moving a vehicle closure panel between open and closed conditions, said drive assembly comprising:

a housing;

a motor mounted on said housing;

a drum and gear assembly rotatably mounted on said housing for movement in a winding direction, said drum and gear assembly comprising a drum having a helical groove and a gear in driving engagement with said motor, said drum and said gear having a lost motion connection defined therebetween to allow manual movement of said drum relative to said gear in said winding direction;

a spring extending between said drum and said gear for biasing said drum in said winding direction relative to said gear; and a cable having an end fixedly secured to the closure panel and an opposite end fixedly secured to said drum to wind said cable about said helical groove during movement of said drum in said winding direction for moving the closure panel between the open and closed conditions.

2. A drive assembly as set forth in claim 1 wherein said drum rotates in said winding direction relative to said gear to prevent slack in said cable resulting from manual movement of the closure panel between the open and closed conditions.

3. A drive assembly as set forth in claim 2 wherein said drum and said gear rotate together in said winding direction upon energizing said motor for effecting a powered movement of the closure panel to the closed condition.

4. A drive assembly as set forth in claim 3 wherein said drum is sized to rotate less than one revolution to effect said powered movement of the closure panel from the open to the closed condition.

5. A drive assembly as set forth in claim 4 wherein said drum includes a tab for engaging said gear to cause rotation of said drum in said winding direction in response to rotation of said gear in said winding direction during said powered movement of the closure panel between the open and closed conditions.

6. A drive assembly as set forth in claim 5 wherein said gear includes a tab extending axially to engage said tab on said drum to cause rotation of said drum in said winding direction in response to rotation of said gear in said winding direction during said powered movement of the closure panel between the open and closed conditions.

7. A drive assembly as set forth in claim 6 wherein said motor is energized in an opposite sense to counter-rotate said gear relative to said drum back to a start position after said powered movement of the closure panel to the closed condition, wherein in said start position said tab of said drum is presented for immediate engagement of said tab of said gear.

8. A drive assembly as set forth in claim 7 including spaced apart side plates for rotatably supporting said drum and gear assembly therebetween.

9. A drive assembly as set forth in claim 8 including an axle for rotatably supporting said drum and gear assembly between said side plates.

10. A drive assembly as set forth in claim 9 wherein said side plates include an aperture for mounting said motor therethrough.

11. A drive assembly as set forth in claim 10 including a driving force multiplying connection defining said driving engagement between said motor and said drum and gear assembly for multiplying by a preselected ratio the rotations of said drum and gear assembly relative to said motor.

12. A drive assembly as set forth in claim 11 wherein said driving force multiplying connection includes a first pinion mounted to an output shaft of said motor for providing said driving engagement between said motor and said drum and gear assembly.

13. A drive assembly as set forth in claim 12 wherein said driving force multiplying connection includes a driven gear mounted on said axle for providing said driving engagement between said motor and said drum and gear assembly.

14. A drive assembly as set forth in claim 13 wherein said driving force multiplying connection includes a second pinion gear coaxially mounted to said driven gear for providing said driving engagement between said motor and said drum and gear assembly.

15. A drive assembly as set forth in claim 14 wherein said driving force multiplying connection includes a drive gear rotatably coupled to said side plates for providing said driving engagement between said motor and said drum and gear assembly.

16. A drive assembly as set forth in claim 15 wherein said driving force multiplying connection includes a drive pinion coaxially mounted to said drive gear and meshingly engaged with said gear of said drum and gear assembly for providing said driving engagement between said motor and said drum and gear assembly.

17. A drive assembly as set forth in claim 16 wherein said driving force multiplying connection includes a first belt trained about said first pinion and said driven gear and a second belt is trained about said drive gear and said second pinion for providing said driving engagement between said motor and said drum and gear assembly.

* * * * *